(12) United States Patent
Sugimoto et al.

(10) Patent No.: US 6,599,853 B2
(45) Date of Patent: Jul. 29, 2003

(54) OPTICAL AMPLIFIER GLASS

(75) Inventors: Naoki Sugimoto, Kanagawa (JP); Setsuro Ito, Kanagawa (JP); Setsuhisa Tanabe, Kyoto (JP)

(73) Assignee: Asahi Glass Company, Limited, Tokyo (JP)

( * ) Notice: Subject to any disclaimer, the term of this patent is extended or adjusted under 35 U.S.C. 154(b) by 23 days.

(21) Appl. No.: 09/766,982

(22) Filed: Jan. 23, 2001

(65) Prior Publication Data

US 2001/0044369 A1 Nov. 22, 2001

(30) Foreign Application Priority Data

Jan. 26, 2000 (JP) ......................... 2000-017448

(51) Int. Cl.[7] .............. C03C 3/15; C03C 3/95; C03C 13/04; C03C 3/062; C03C 3/068; H04B 10/12; H01S 3/00

(52) U.S. Cl. .............. 501/50; 501/64; 501/73; 501/77; 501/78; 501/37; 501/41; 359/341.5; 359/343

(58) Field of Search .............. 501/37, 38, 41, 501/42, 49, 50, 51, 53, 55, 56, 57, 58, 59, 60, 61, 62–73, 77, 78; 252/301; 359/341

(56) References Cited

U.S. PATENT DOCUMENTS 5,114,884 A * 5/1992 Lapp et al. .............. 501/41
2002/0041436 A1 * 4/2002 Kondo et al. ............ 359/341.5

FOREIGN PATENT DOCUMENTS

| JP | 3-218945 | 9/1991 |
| JP | 8-110535 | 4/1996 |
| JP | 11-236245 | 3/1999 |
| WO | WO 00/23392 | * 2/2000 |

OTHER PUBLICATIONS

Man, S. Q., Wong, R. S. F., Pun, E.Y.B., and Chung, P.S., "Frequency upconversion in Er3+ doped alkali bismuth gallate glasses", Nov. 1999, LEOS '99. IEEE Lasers and Electro–Optics Society Annual Meeting, vol. 2, pp. 812–813.*

Lapp, J.C., "Alkali Bismuth Gallate Glasses", Oct. 1992, American Ceramic Society Bulletin, vol. 71, No. 10, pp. 1543–1549.*

* cited by examiner

Primary Examiner—David Sample
Assistant Examiner—Elizabeth A. Bolden
(74) Attorney, Agent, or Firm—Oblon, Spivak, McClelland, Maier & Neustadt, P.C.

(57) ABSTRACT

An optical amplifier glass comprising a matrix glass containing $Bi_2O_3$ and at least one of $Al_2O_3$ and $Ga_2O_3$, and Er doped to the matrix glass, wherein from 0.01 to 10% by mass percentage of Er is doped to the matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 $\mu$m, a glass transition temperature of at least 360° C. and an optical basicity of at most 0.49.

23 Claims, 1 Drawing Sheet

OPTICAL AMPLIFIER GLASS

BACKGROUND OF THE INVENTION

1. Field of the Invention

The present invention relates to an optical amplifier glass, particularly a broadband optical amplifier glass which is operable in a wavelength range of from 1.55 to 1.65 μm.

2. Discussion of Background

For the purpose of application to the optical communication field, there have been research and development of an optical fiber amplifier using as an optical amplification medium an optical fiber having a rare earth element doped to the core, and an Er (erbium)-doped optical fiber amplifier (EDFA), and their application to an optical communication system is being actively pursued. On the other hand, to cope with diversification of communication services expected in future, a wavelength division multiplexing communication system (WDM) has been proposed to increase the transmission capacity. As the number of wavelength division multiplexing channels increases, the transmission capacity will increase. Application of EDFA to such a wavelength division multiplexing transmission system is also being studied. As EDFA so far proposed, an Er-doped quartz type fiber and an Er-doped fluoride fiber are known.

In the case of a conventional Er-doped quartz type fiber, the wavelength dependency of the gain is sharp, and the wavelength width wherein an adequate gain is obtainable, is as narrow as from about 10 to 30 nm. Consequently, so far as such conventional EDFA is employed, the number of wavelength division multiplexing channels is limited to a level of from 30 to 40 channels.

If EDFA showing a flat gain within a wider wavelength range, is realized, it is expected to be able to broaden the useful signal wavelength and thereby to substantially improve the transmission capacity. Accordingly, development of such EDFA is desired.

In order to solve such problems, an optical amplifier which can be used in a wide wavelength range has been proposed wherein amplifiers having different amplification gain characteristics to wavelengths, are arranged in series or in parallel, but there has been a problem such that the structure tends to be cumbersome, or in the vicinity of the center of the wavelength range, there is a region where no amplification is possible. Further, JP-A-8-110535 proposes a tellurite type glass as a glass capable of amplification in a broadband range. However, such tellurite type glass usually has a low glass transition point and is thermally unstable. In order to improve the amplification gain of an optical amplifier, it is necessary to let a high intensity excited laser beam enter into the glass, but such glass was likely to be thermally damaged by the strong laser beam.

SUMMARY OF THE INVENTION

It is an object of the present invention to solve the above-mentioned problems and to provide an optical amplifier glass having a high glass transition point and having a wide wavelength width wherein the gain is obtainable.

The present invention provides an optical amplifier glass comprising a matrix glass containing $Bi_2O_3$ and at least one of $Al_2O_3$ and $Ga_2O_3$, and Er doped to the matrix glass, wherein from 0.01 to 10% by mass percentage of Er is doped to the matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C. and an optical basicity of at most 0.49.

DETAILED DESCRIPTION OF THE PREFERRED EMBODIMENTS

With an optical amplifier glass having Er-doped to a matrix glass, optical amplification is carried out by means of stimulated emission transition from the $^4I_{13/2}$ level to the $^4I_{15/2}$ level of Er. The present inventors have found that the wavelength width wherein the optical amplification gain is obtainable, is dependent on the optical basicity which will be described hereinafter, and have thus arrived at present invention. The wavelength width within which the optical amplification gain is obtainable, will hereinafter be referred to as "the gain wavelength width".

The gain wavelength width has heretofore been considered to be as follows. Namely, the gain wavelength width is dependent on the refractive index of the matrix glass, i.e. the gain wavelength width increases as the refractive index increases. This has been explained such that the electric field which Er receives in the matrix glass increases as the refractive index increases, and consequently, the energy level of Er is broadened, whereby the emission spectrum becomes broad.

However, the present inventors have found that the gain wavelength width $\Delta\lambda$ is not only dependent on the refractive index of the matrix glass but also strongly dependent on the optical basicity $\Lambda$ of the matrix glass, which will be described hereinafter, i.e. $\Delta\lambda$ becomes large as $\Lambda$ becomes small.

With respect to a glass composition represented by mol % of oxide components, the optical basicity $\Lambda$ is defined as follows. Namely, with a glass containing $C_i$ mol % of an oxide of component i, $$\Lambda=1-\Sigma[z_i \cdot r_i(\gamma_i-1)/2\gamma_i]$$

$\Sigma$ indicates summing up with respect to subscript i $$\gamma_i=1.36(x_i-0.26)$$

$z_i$: valency of the cation in the oxide of component i, $r_i$: the ratio of the number of cations in the oxide of component i to the total number of oxygen in the above "glass composition represented by mol % of oxide components", $x_i$: the Pauling's electronegativity of an atom bonded to oxygen in the oxide of component i.

For reference, the Pauling's electronegativities of main atoms are shown below.

Li:1.0, Na:0.9, K:0.8, Mg:1.2, Ca:1.0, Sr:1.0, Zn:1.6, Ba:0.9, B:2.0, Al:1.5, Si:1.8, P:2.1, Ge:1.8, Ga:1.6, Te:2.1, Sn:1.8, Sb:1.9, W:1.7, Pb:1.8, Bi:1.9, and Ti:1.5.

For example, with respect to a glass wherein the oxide of the first component is $Bi_2O_3$, and the oxide of the second component is $SiO_2$, and the composition represented by mol % is $20Bi_2O_3/80SiO_2$, $z_1=3$, $z_2=4$ Total number of oxygen=$0.2\times3+0.8\times2=2.2$, $r_1=0.2\times2/2.2$, $r_2=0.8\times1/2.2$, $x_1=1.9$, $x_2=1.8$, $\Lambda=0.47$.

The optical basicity is one which Duffy et al. have proposed as an index of the basicity of glass in J. Am. Chem. Soc., 93 (1971) 6448, and it is one obtainable by a simple calculation from the glass composition without necessity of carrying out the measurement or complex analysis or calculation.

Now, the relation between $\Lambda$ and $\Delta\lambda$ will be described based on data.

Glasses A to I having Er doped to a matrix glass having a composition shown by mol % in lines for from $Bi_2O_3$ to ZnO in Table 1, were prepared. The amount of Er doped, is shown in the line for Er in Table 1 by mass % based on the matrix glass being 100%. With respect to these glasses, the refractive index n at a wavelength of 1.55 μm, the glass transition point Tg (unit: ° C.) and the gain wavelength width $\Delta\lambda$ (unit: nm) were measured. Further, the optical basicity $\Lambda$ was calculated from the composition. The measuring methods for n, Tg and $\Delta\lambda$ were as follows.

n: measured by an Ellipsometer.

Tg: measured by a differential thermal analysis (DTA).

$\Delta\lambda$: excited by a laser beam with a wavelength of 980 nm, and it was obtained from the emission spectrum obtained by this excitation.

TABLE 1

|  | A | B | C | D | E | F | G | H | I |
|---|---|---|---|---|---|---|---|---|---|
| $Bi_2O_3$ | — | — | 40 | — | — | — | 20 | — | — |
| $B_2O_3$ | — | — | 20 | — | 20 | — | — | — | — |
| $SiO_2$ | — | 70 | 20 | — | 70 | — | 50 | — | 97.9 |
| $Al_2O_3$ | — | — | — | — | — | — | — | — | 0.1 |
| $GeO_2$ | — | — | — | — | — | — | — | — | 2 |
| $TiO_2$ | — | — | — | — | — | — | 10 | — | — |
| $TeO_2$ | 75 | — | — | 75 | — | 75 | — | 75 | — |
| $Na_2O$ | 5 | 20 | 20 | 20 | 10 | 15 | 10 | 7 | — |
| CaO | — | 10 | — | — | — | — | — | — | — |
| BaO | — | — | — | — | — | — | 10 | — | — |
| ZnO | 20 | — | — | 5 | — | 10 | — | 18 | — |
| Er | 0.5 | 0.5 | 0.5 | 2.5 | 1.0 | 1.0 | 0.5 | 0.5 | 0.05 |
| n | 2 | 1.5 | 2 | 1.9 | 1.5 | 1.92 | 1.8 | 1.97 | 1.49 |
| Tg | 299 | 550 | 370 | 270 | 490 | 285 | 470 | 292 | 1010 |
| $\Lambda$ | 0.438 | 0.587 | 0.505 | 0.490 | 0.495 | 0.455 | 0.547 | 0.445 | 0.478 |
| $\Delta\lambda$ | 69 | 18 | 30 | 35 | 32 | 48 | 22 | 59 | 3838 |

Figure 1:
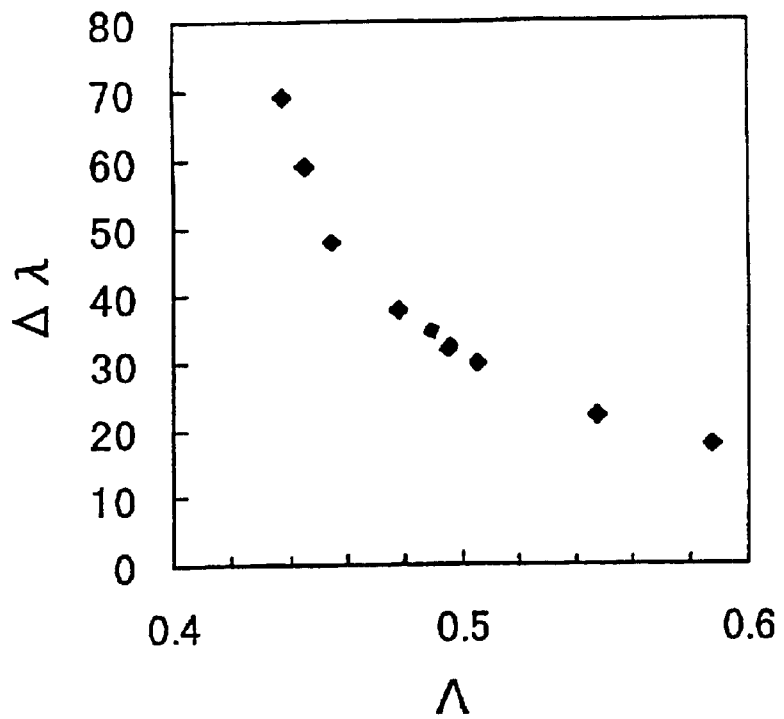
FIG. 1 is a graph showing the relation between the optical basicity $\Lambda$ of glass and the wavelength width $\Delta\lambda$ (unit: nm) wherein the optical amplification gain is obtainable.

FIG. 1 is a graph wherein the relation between $\Lambda$ and $\Delta\lambda$ in Table 1, was plotted.

As is evident from FIG. 1, $\Delta\lambda$ increases as $\Lambda$ becomes small. The reason is not clearly understood, but it is considered that in a matrix glass having small $\Lambda$, the polarizability of O (oxygen) ions surrounding Er ions tends to decrease, whereby the electrical shielding effect of Er ions tends to be large, and consequently, the proportion of the electric dipole transition to the magnetic dipole transition of Er tends to be large.

Further, as is evident from Table 1, even with glasses having substantially the same refractive index n, $\Delta\lambda$ is not necessarily the same. For example, n of each of glass A and glass C is 2, $\Delta\lambda$ of glass A is 69 nm, and $\Delta\lambda$ of glass C is 30 nm, and thus, the difference in $\Delta\lambda$ of the two is substantial. Such a difference can not be expected by the conventional concept such that $\Delta\lambda$ is dependent largely on n, and can be expected for the first time by the discovery relating to $\Lambda$ and $\Delta\lambda$ by the present inventors.

The optical amplifier glass of the present invention is used usually in the form of a fiber.

In the optical amplifier glass of the present invention, from 0.01 to 10% by mass percentage of Er is doped in the matrix glass. Here, the matrix glass is regarded as 100%. The matrix glass in the optical amplifier glass of the present invention will be referred to hereinafter simply as the matrix glass of the present invention.

If the amount of Er is less than 0.01%, the desired optical amplification can not be obtained. Preferably, it is at least 0.1%, more preferably at least 0.3%. If it exceeds 10%, optical quenching by concentration tends to occur, whereby the optical amplification tends to decrease. It is preferably at most 5%, more preferably at most 1%. When the optical amplifier glass of the present invention is used in the form of a fiber, the amount of Er is preferably adjusted depending upon the length of the fiber. Namely, it is preferred that when the fiber is long, the amount is adjusted to be small, and when the fiber is short, the amount is adjusted to be large.

The refractive index at a wavelength of 1.55 μm of the matrix glass of the present invention is at least 1.8. If it is less than 1.8, the electric dipole transition of Er tends to hardly take place, whereby $\Delta\lambda$ tends to be too small. It is preferably at least 1.9, more preferably at least 2.0.

The glass transition point of the matrix glass of the present invention is at least 360° C. If it is less than 360° C., when the temperature of glass becomes locally high by the use of a laser beam of high intensity as an excitation light, the glass tends to be thermally damaged, and the desired optical amplification tends to hardly be obtained. It is preferably at least 380° C., more preferably at least 400° C.

The optical basicity of the matrix glass of the present invention is at most 0.49. If it exceeds 0.49, $\Delta\lambda$ tends to be too small. It is preferably at most 0.485, more preferably at most 0.48.

To reduce the optical basicity, it is preferred to introduce into the glass atoms having large values of the above-mentioned $z_i$ (valency of the cation) and/or the above-mentioned $x_i$ (the Pauling's electronegativity of atoms). As such atoms, Bi, Si, Al or Ga may, for example, be mentioned. Accordingly, it is preferred that the matrix glass of the present invention is a $Bi_2O_3/SiO_2/M_2O_3$ type glass. Here, $M_2O_3$ is $Al_2O_3$ and/or $Ga_2O_3$.

Now, the composition of the matrix glass of the present invention will be described, wherein mol % will be represented simply as %.

$Bi_2O_3$ is an essential component. If it is less than 20%, the electric dipole transition of Er tends to hardly occur, whereby $\Delta\lambda$ tends to be too small. It is preferably at least 25%, more preferably at least 30%. Further, its content is preferably at most 80%. If it exceeds 80%, vitrification tends to be difficult, or devitrification tends to take place during processing into a fiber, or the glass transition point tends to be too low. Preferably, it is at most 70%, more preferably at most 65%. Here, devitrification is meant for distinct precipitation of crystals, which causes breakage of the fiber during the fiber processing or the breakage of the fiber during use as an optical amplifier glass fiber.

At least one of $Al_2O_3$ and $Ga_2O_3$ must be contained. If the total content thereof is less than 0.1%, crystallization of glass is likely to take place. It is preferably at least 1%. Further, the total content is preferably at most 30%. If it exceeds 30%, vitrification tends to be difficult, or the glass transition point tends to be too low. It is more preferably at most 25%.

The content of $Al_2O_3$ is preferably at most 10%. If it exceeds 10%, the optical amplification is likely to deteriorate. It is more preferably at most 8%, particularly preferably at most 6%. When $Al_2O_3$ is contained, the content is preferably at least 0.1%, more preferably at least 1%.

The content of $Ga_2O_3$ is preferably at most 30%. If it exceeds 30%, the optical amplification is likely to deteriorate, or the glass transition point is likely to be too low. It is more preferably at most 20%. When $Ga_2O_3$ is contained, the content is preferably at least 0.1%, more preferably at least 1%.

$B_2O_3$ is not an essential component, but it is a network former and is preferably contained in a range of up to 75% in order to facilitate formation of glass by suppressing precipitation of crystals during the preparation of glass. It is more preferably at most 50%, particularly preferably at most 30%. When $B_2O_3$ is contained, the content is preferably at least 1%.

Further, in some cases, it is preferred that the $B_2O_3$ content is less than 15%. For example, such is preferred when the total content of $Al_2O_3$ and $Ga_2O_3$ exceeds 1%.

$SiO_2$ is not an essential component, but it is a network former and is preferably contained in a range of up to 79.9% in order to facilitate formation of glass by suppressing precipitation of crystals during the preparation of glass. It is more preferably at most 50%, particularly preferably at most 40%. When $SiO_2$ is contained, the content is preferably at least 1%.

Further, the total content of $Bi_2O_3$ and $SiO_2$ is preferably at least 50%.

In order to facilitate formation of glass by suppressing precipitation of crystals during the preparation of glass, it is preferred to incorporate at least one of $B_2O_3$ and $SiO_2$. The total content thereof is preferably within a range of from 5 to 60%. If it is less than 5%, vitrification is likely to be difficult, or the optical amplification tends to be inadequate, or devitrification is likely to occur during the fiber processing. It is more preferably at least 10%, particularly preferably at least 15%. If it exceeds 60%, the optical amplification is likely to be inadequate. It is more preferably at most 55%, particularly preferably at most 50%.

$GeO_2$ is not essential, but it facilitates formation of glass and has an effect to increase the refractive index. Thus, it may be doped up to 30%. If it exceeds 30%, the glass tends to crystallize. It is preferably at most 10%, more preferably at most 5%. When $GeO_2$ is contained, the content is preferably at least 0.1%, more preferably at least 1%.

Each of $Li_2O$, $TiO_2$, $ZrO_2$ and $SnO_2$ is not essential, but each of them may be doped within a range of up to 50% in order to suppress devitrification during fiber processing. Each content is preferably at most 10%.

$WO_3$ is not essential but may be doped up to 30% in order to increase $\Delta\lambda$. If the content exceeds 30%, the optical amplification is likely to deteriorate. It is more preferably at most 20%, particularly preferably at most 10%.

$TeO_2$ is not essential but may be doped up to 30% in order to increase $\Delta\lambda$. If the content exceeds 30%, the optical amplification is likely to deteriorate. It is more preferably at most 20%, particularly preferably at most 17%.

The total content of $WO_3$ and $TeO_2$ is preferably at most 27%. If the total content exceeds 27%, crystals are likely to precipitate, whereby vitrification or fiber processing tends to be difficult. It is more preferably at most 20%, particularly preferably at most 15%.

$CeO_2$ is not essential, but it has an effect to suppress reduction of $Bi_2O_3$ in the glass composition during melting of glass to precipitate metal bismuth thereby to lower the transparency of glass and may be doped up to 10%. If it exceeds 10%, vitrification tends to be difficult. It is more preferably at most 1%, particularly preferably at most 0.5%.

Further, if $CeO_2$ is contained, it may happen that yellow or orange coloring tends to increase, whereby the transmittance of glass tends to decrease, and the background loss at an excitation light wavelength (such as 980 nm) or a signal light wavelength tends to increase. From this viewpoint, the content of $CeO_2$ is preferably less than 0.15%, particularly preferably substantially zero.

It is preferred that the matrix glass of the present invention consists essentially of the above described components, but components other than the above described components ("other components") may be contained within a range not to impair the purpose of the present invention. For example, to facilitate vitrification or to suppress devitrification during fiber processing, BeO, MgO, CaO, SrO, BaO, $Na_2O$, $K_2O$, $Cs_2O$, $La_2O_3$, ZnO, CdO, $In_2O_3$ or PbO may, for example, be contained. The total content of such other components is preferably not more than 10%.

As a preferred composition of the matrix glass of the present invention, the following may be mentioned, as represented by mol % based on the following oxides:

| Oxides | Mol % |
|---|---|
| $Bi_2O_3$ | 20 to 80, |
| $B_2O_3$ | 0 to 75, |
| $SiO_2$ | 0 to 79.9, |
| $Al_2O_3$ | 0 to 10, |
| $Ga_2O_3$ | 0 to 30, |
| $GeO_2$ | 0 to 30, |
| $Li_2O$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, and |
| $CeO_2$ | 0 to 10, | wherein at least one of $B_2O_3$ and $SiO_2$ is contained, and the total content of $Al_2O_3$ and $Ga_2O_3$ is at least 0.1 mol %.

The method for preparing the optical amplifier glass of the present invention is not particularly limited, and it can be prepared by mixing the prescribed starting materials, putting the mixture into a platinum crucible, an alumina crucible, a quartz crucible or an iridium crucible, melting it in air at a temperature of from 800 to 1,300° C., and casting the obtained melt in a prescribed mold. Otherwise, it may be prepared by a method other than the melting method, such as a sol gel method or a gas phase vapor deposition method.

From the glass thus prepared, a preform may be prepared and formed into a fiber, or such a glass may be formed into a fiber by a double crucible method, to obtain an optical amplifier fiber.

Now, the present invention will be described in further detail with reference to Examples. However, it should be understood that the present invention is by no means restricted to such specific Examples.

EXAMPLES

Glasses 1 to 10 were prepared which had Er doped to the matrix glasses having the compositions shown by mol % in lines from $Bi_2O_3$ to $CeO_2$ in Table 2. The amount of Er doped is represented by mass %, based on the matrix glass being 100%. With respect to each of these glasses, the refractive index n at a wavelength of 1.55 μm, the glass transition point Tg (unit: ° C.) and the gain wavelength width Δλ (unit: nm) were measured by the above-mentioned methods. Further, from the composition, the optical basicity Λ was calculated. Glasses 1 to 9 represent Working Examples of the present invention. Glass 10 is an Er-doped quartz type glass which is the same as glass 1 in Table 1 and represents a Comparative Example.

Figure 2:
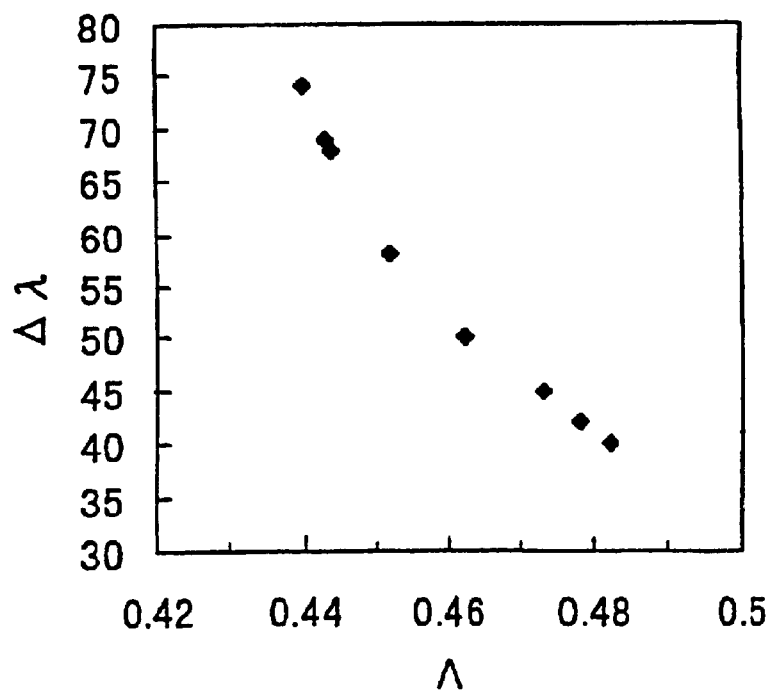
FIG. 2 is a graph showing the relation between the optical basicity $\Lambda$ of an optical amplifier glass of the present invention and the wavelength width $\Delta\lambda$ (unit: nm) wherein the optical amplification gain is obtainable.

FIG. 2 is a graph wherein the relation between Λ and Δλ in Table 2 was plotted. As is evident from this Figure, Δλ increases as Λ becomes small. Here, Δλ is preferably at least 40 nm.

TABLE 2

|  | 1 | 2 | 3 | 4 | 5 | 6 | 7 | 8 | 9 | 10 |
|---|---|---|---|---|---|---|---|---|---|---|
| $Bi_2O_3$ | 43 | 43 | 43 | 45 | 40 | 43 | 43 | 43 | 62.8 | — |
| $B_2O_3$ | — | — | — | 5 | 1 | 27 | 28 | 28 | 30 | — |
| $SiO_2$ | 29 | 36 | 22 | 20 | 20 | 20 | 21 | 14 | 4 | 97.9 |
| $Al_2O_3$ | 3 | 3 | 3 | 2 | 2 | 1 | — | 1 | — | 0.1 |
| $Ga_2O_3$ | 18 | 18 | 18 | 8 | 19 | — | 1 | — | 3 | 2 |
| $GeO_2$ | — | — | — | — | — | 2 | — | — | — | — |
| $TiO_2$ | — | — | — | — | 6 | — | — | — | — | — |
| $SnO_2$ | — | — | — | 6 | — | — | — | — | — | — |
| $WO_3$ | — | — | — | 2 | 2 | 7 | — | — | — | — |
| $TeO_2$ | 7 | — | 14 | 12 | 10 | — | 7 | 14 | — | — |
| $CeO_2$ | — | — | — | — | — | — | — | — | 0.2 | — |
| Er | 0.5 | 0.5 | 0.5 | 2.5 | 1.0 | 1.0 | 0.5 | 0.5 | 0.5 | 0.05 |
| n | 2.02 | 2.01 | 2.01 | 2.10 | 2.05 | 2.01 | 2.01 | 2.02 | 2.21 | 1.49 |
| Tg | 450 | 475 | 420 | 440 | 445 | 420 | 415 | 410 | 370 | 1010 |
| Λ | 0.478 | 0.482 | 0.473 | 0.462 | 0.482 | 0.452 | 0.443 | 0.440 | 0.444 | 0.478 |
| Δλ | 42 | 40 | 45 | 50 | 50 | 58 | 69 | 74 | 68 | 38 |

By employing the optical amplifier glass of the present invention, optical amplification within a broader band will be possible, and transmission of information of a large capacity by a wavelength division multiplexing transmission system will be possible. Further, the thermal damage scarcely occurs even if a high intensity laser beam is used as the excitation light.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2000-17448 filed on Jan. 26, 2000 including specification, claims, drawings and summary are doped herein by reference in its entirety.

What is claimed is:

1. An optical amplifier glass comprising a matrix glass comprising the following oxides:

| Oxides | Mol % |
|---|---|
| $Bi_2O_3$ | 20 to 80, |
| $B_2O_3$ | 0 to 75, |
| $SiO_2$ | 0 to 79.9, |
| $Al_2O_3$ | 0 to 10, |
| $Ga_2O_3$ | 0 to 30, |
| $GeO_2$ | 0 to 30, |
| $Li_2O$ | 0 to 50, |
| $TiO_2$ | 0 to 50, |
| $ZrO_2$ | 0 to 50, |
| $SnO_2$ | 0 to 50, |

-continued

| Oxides | Mol % |
|---|---|
| $WO_3$ | 0 to 30, |
| $TeO_2$ | 0 to 30, and |
| $CeO_2$ | 0 to 10 | wherein at least one of $B_2O_3$ and $SiO_2$ is contained, and Er doped to said matrix glass, wherein from 0.01 to 10% by mass percentage of Er is doped to said matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C., an optical basicity of at most 0.49.

2. The optical amplifier glass as claimed in claim 1, wherein said $B_2O_3$ is in a content of at most 30 mol %.

3. The optical amplifier glass as claimed in claim 1, wherein said $SiO_2$ is in a content of from 1 to 50 mol %.

4. The optical amplifier glass as claimed in claim 1, wherein 0.3 to 5.0% by mass percentage of Er is doped to said matrix glass.

5. The optical amplifier glass as claimed in claim 1, wherein said refractive index is at least 2.0.

6. The optical amplifier glass as claimed in claim 1, wherein said $Al_2O_3$ is in a content of 0.1 to 10 mol %.

7. The optical amplifier glass as claimed in claim 1, wherein said $Ga_2O_3$ is in a content of 1 to 19 mol %.

8. The optical amplifier glass as claimed in claim 1, wherein said $GeO_2$ is in a content of 0.1 to 30 mol %.

9. The optical amplifier glass as claimed in claim 1, wherein said $CeO_2$ is in a content of at most 0.15 mol %.

10. The optical amplifier glass as claimed in claim 1, wherein said matrix glass contains substantially no $CeO_2$.

11. The optical amplifier glass as claimed in claim 1, wherein said $B_2O_3$ is in a content of less than 15 mol %.

12. An optical amplifier glass comprising a matrix glass comprising the following oxides:

| Oxides | Mol % |
|---|---|
| $Bi_2O_3$ | 20 to 80, |
| $B_2O_3$ | 0 to 75, |
| $SiO_2$ | 0 to 79.9, |
| $Al_2O_3$ | 0 to 10, |
| $Ga_2O_3$ | 0 to 30, |

-continued

| Oxides | Mol % |
|---|---|
| $GeO_2$ | 0 to 30, |
| $Li_2O$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, and |
| $CeO_2$ | 0 to 10; and | at least one of $B_2O_3$ and $SiO_2$ is contained, at least one of $Al_2O_3$ and $Ga_2O_3$ is contained, Er doped to said matrix glass, and no $K_2O$ is contained, wherein from 0.01 to 10% by mass percentage of Er is doped to said matrix glass which has a total content of $Al_2O_3$ and $Ga_2O_3$ of at least 0.1 mol %, a refractive index of at least 1.8 at a wavelength of 1.55 μm, a glass transition temperature of at least 360° C., an optical basicity of at most 0.49.

13. The optical amplifier glass as claimed in claim 12, wherein said $B_2O_3$ is in a content of at most 30 mol %.

14. The optical amplifier glass as claimed in claim 12, wherein said $SiO_2$ is in a content of from 1.0 to 50 mol %.

15. An optical amplifier glass comprising a matrix glass comprising the following oxides:

| Oxides | Mol % |
|---|---|
| $Bi_2O_3$ | 20 to 80, |
| $B_2O_3$ | 0 to 75, |
| $SiO_2$ | 0 to 79.9, |
| $Al_2O_3$ | 0 to 10, |
| $Ga_2O_3$ | 0 to 30, |
| $GeO_2$ | 0 to 30, |
| $Li_2O$ | 0 to 50, |
| $TiO_2$ | 0 to 50, |
| $ZrO_2$ | 0 to 50, |
| $SnO_2$ | 0 to 50, |
| $WO_3$ | 0 to 30, |
| $TeO_2$ | 0 to 30, and |
| $CeO_2$ | 0 to 10; and | at least one of $B_2O_3$ and $SiO_2$ is contained, at least one of $Al_2O_3$ and $Ga_2O_3$, and Er doped to said matrix glass, wherein from 0.01 to 10% by mass percentage of Er is doped to the matrix glass which has a total content of $Al_2O_3$ and $Ga_2O_3$ of at least 0.1 mol %, a refractive index of at least 1.8 at a wavelength of 1.55 μm, a glass transition temperature of at least 360° C., an optical basicity of at most 0.485.

16. The optical amplifier glass as claimed in claim 15, wherein said $B_2O_3$ is in a content of at most 30 mol %.

17. The optical amplifier glass as claimed in claim 15, wherein said $SiO_2$ is in a content of from 1 to 50 mol %.

18. An optical amplifier glass comprising a matrix glass comprising $Bi_2O_3$, at least one of $Al_2O_3$ and $Ga_2O_3$, Er doped to said matrix glass, and no $K_2O$, wherein from 0.01 to 10% by mass percentage of Er is doped to said matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C., an optical basicity of at most 0.49, and said $Al_2O_3$ is in a content of 0.1 to 10 mol %.

19. An optical amplifier glass comprising a matrix glass comprising $Bi_2O_3$, at least one of $Al_2O_3$ and $Ga_2O_3$, and Er doped to said matrix glass, wherein from 0.01 to 10% by mass percentage of Er is doped to the matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C., an optical basicity of at most 0.485, and said $Al_2O_3$ is in a content of 0.1 to 10 mol %.

20. An optical amplifier glass comprising a matrix glass comprising $Bi_2O_3$, at least one of $Al_2O_3$ and $Ga_2O_3$, Er doped to said matrix glass, and no $K_2O$, wherein from 0.01 to 10% by mass percentage of Er is doped to said matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C., an optical basicity of at most 0.49, and said $Ga_2O_3$ is in a content of 1 to 19 mol %.

21. An optical amplifier glass comprising a matrix glass comprising $Bi_2O_3$, at least one of $Al_2O_3$ and $Ga_2O_3$, and Er doped to said matrix glass, wherein from 0.01 to 10% by mass percentage of Er is doped to the matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C., an optical basicity of at most 0.485, and said $Ga_2O_3$ is in a content of 1 to 19 mol %.

22. An optical amplifier glass comprising a matrix glass comprising $Bi_2O_3$, at least one of $Al_2O_3$ and $Ga_2O_3$, Er doped to said matrix glass, no $K_2O$, and $GeO_2$ in a content of 0.1 to 30 mol %, wherein from 0.01 to 10% by mass percentage of Er is doped to said matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C., and an optical basicity of at most 0.49.

23. An optical amplifier glass comprising a matrix glass comprising $Bi_2O_3$, at least one of $Al_2O_3$ and $Ga_2O_3$, Er doped to said matrix glass, and $GeO_2$ in a content of 0.1 to 30 mol %, wherein from 0.01 to 10% by mass percentage of Er is doped to the matrix glass which has a total content of $Al_2O_3$ and $Ga_2O_3$ of at least 0.1 mol %, a content of $Bi_2O_3$ of at least 20 mol %, a refractive index of at least 1.8 at a wavelength of 1.55 μm, a glass transition temperature of at least 360° C., an optical basicity of at most 0.485.

* * * * *